US008380007B2

(12) United States Patent
Chan et al.

(10) Patent No.: US 8,380,007 B2
(45) Date of Patent: Feb. 19, 2013

(54) SYSTEM AND METHOD FOR ENABLING SELECTION OF AN IMAGE REGISTRATION TRANSFORMATION

(75) Inventors: Raymond C. Chan, Brookline, MA (US); Robert Manzke, Cambridge, MA (US); Shunmugavelu Sokka, Brighton, MA (US); Volker Rasche, Erbach (DE); Vivek Reddy, Boston, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1259 days.

(21) Appl. No.: 12/096,648

(22) PCT Filed: Dec. 5, 2006

(86) PCT No.: PCT/IB2006/054616
§ 371 (c)(1),
(2), (4) Date: Jun. 9, 2008

(87) PCT Pub. No.: WO2007/066294
PCT Pub. Date: Jun. 14, 2007

(65) Prior Publication Data
US 2008/0279430 A1 Nov. 13, 2008

(51) Int. Cl.
*G06K 9/32* (2006.01)
(52) U.S. Cl. ...................................................... 382/294
(58) Field of Classification Search .................. 345/427, 345/645; 348/580; 382/276, 278, 294, 302, 382/305; 707/602
See application file for complete search history.

(56) References Cited

U.S. PATENT DOCUMENTS

| 6,539,127 | B1 * | 3/2003 | Roche et al. ............... 382/294 |
| 6,718,052 | B1 * | 4/2004 | Matsumoto et al. ......... 382/125 |
| 6,775,404 | B1 | 8/2004 | Pagoulatos |
| 6,868,172 | B2 | 3/2005 | Boland |
| 2005/0049477 | A1 | 3/2005 | Fu |
| 2005/0094898 | A1 | 5/2005 | Xu |
| 2005/0147325 | A1 | 7/2005 | Chen |

FOREIGN PATENT DOCUMENTS

| DE | 19705600 A1 | 8/1998 |
| WO | 2005059831 A1 | 6/2005 |

OTHER PUBLICATIONS

Thevenaz, Philippe et al "An Efficient Mutual Information Optimizer for Multiresolution Image Registration" Image Processing 1998, vol. 1, pp. 833-837.

* cited by examiner

*Primary Examiner* — Gregory F Cunningham

(57) ABSTRACT

System and method for enabling intra-operative selection of an image registration transformation for use in displaying a first image dataset and a second image dataset in correspondence with one another. Image dataset acquisition devices (12, 14) obtain the first and second image datasets. A similarity function indicative of a likelihood that the first and second image datasets are in correspondence with one another is computed by a processor (16) and then a ranking of each of a plurality of local maxima of the similarity function is determined. Registration transformations derived from a plurality of the local maxima are displayed on a display (18), and using a user-interface (22), a physician can select each registration transformation to ascertain visually whether it is the clinically-optimal registration transformation for subsequent use.

18 Claims, 5 Drawing Sheets

| 52 | 54 | 56 |
|---|---|---|
| 1 | 100 |  |
| 2 | 110 |  |
| 3 | 105 |  |
| 4 | 65 |  |
| 5 | 60 |  |

SYSTEM AND METHOD FOR ENABLING SELECTION OF AN IMAGE REGISTRATION TRANSFORMATION

The present invention relates generally to a system for enabling selection of an image registration transformation and more particularly to a system for enabling intraoperative, physician-guided selection of a clinically-optimal registration transformation for transforming a pre-operatively or intra-operatively obtained image dataset into the coordinate space of other image datasets being obtained, for example, during an invasive interventional procedure.

The present invention also relates to a method for enabling a physician to select, during an invasive surgical procedure, one of a plurality of concurrently displayed registration transformations for transforming a pre-operatively or intra-operatively obtained image dataset into the coordinate space of other image datasets being obtained during the interventional procedure.

Image-guidance plays an increasingly important role in minimally-invasive interventional procedures such as those routinely performed in clinical electrophysiology (EP) labs and cardiac catheterization labs. The added-value of information from multiple imaging modalities performed either pre-operatively, such as MDCT and MRI, or intra-operatively, such as volumetric ultrasound and CT-like reconstructions from rotational X-ray, and represented by image datasets has motivated the need for multimodality fusion of such image datasets with other intra-operatively acquired information, for example, image datasets from rotational X-ray, ultrasound (U/S) and electroanatomical mapping. The image datasets typically represent anatomical and functional information from structures like the brain, heart, lungs and the like, or could represent symbolic information such a structure names, object features, anatomical curvature, brain functions and the like.

Rapid and accurate registration of these pre-operative and intra-operatively acquired image datasets is essential for image-guided intervention and clinical decision making. Registration of image datasets constitutes the process in which two different image datasets are compared to one another to ascertain how they match or align with each other. Once this is determined, the image datasets can be correctly displayed superimposed or fused onto one another.

In most if not all currently performed registration processes, a similarity measure is computed that reflects the likelihood that two datasets are in alignment with one another, given the current estimate for the geometric transformation. A similarity measure is often referred to as a similarity objective function. Transformation parameter estimates are optimized over the similarity function to identify parameter estimates associated with the global maximum and the resulting transformation is displayed as a fusion result. Possible similarity functions include normalized cross-correlation, mutual information, sum-of-squared-differences and sum-of-absolute-differences.

Ideally, the similarity function will have a prominent local maximum which is the largest local maximum. With typical imaging systems, a single registration result corresponding to the largest maximum is displayed. However, this maximum may not correspond to a clinically-acceptable "optimal" registration, forcing the physician to perform time-consuming and tedious manual alignment of the datasets intra-operatively.

Moreover, a common problem with the fusion of real patient data is the presence of multiple local maxima in the similarity function, which may have similar cost values. Only the largest one of these local maxima is now considered for the registration transformation.

It would therefore be beneficial to enable a physician to select from a group of several possible registration transformations in an effort to identify the optimal registration transformation to be used in transforming images needed to perform image-guided intervention and clinical decision making.

It is an object of the present invention to provide a new and improved system for enabling selection of an image registration transformation.

It is another object of the present invention to provide a new and improved system for enabling intraoperative, physician-guided selection of a clinically-optimal registration transformation for transforming pre-operatively and intra-operatively obtained image datasets into image datasets being obtained, for example, during an invasive interventional procedure.

It is another object of the present invention to provide a new and improved system for selection of registration information which provides multiple registration results as a rank list of high-likelihood candidates of the clinically-optimal registration and enables a physician to select one of these.

It is yet another object of the present invention to provide a new and improved system for selection of a clinically-optimal registration transformation which does not provide only a single registration result, e.g., the registration result corresponding to the largest maximum of a similarity function representing the similarity between multiple datasets.

It is yet another object of the present invention to provide a new and improved system for selection of a clinically-optimal registration transformation which minimizes or even eliminates the need for a physician to perform manual alignment of datasets intra-operatively.

It is yet another object of the present invention to provide a new and improved method for enabling a physician to select, during an invasive surgical procedure, one of a plurality of concurrently displayed registration transformations for transforming pre-operatively and intra-operatively obtained images into other images being obtained during the surgical procedure.

In order to achieve these objects and others, a system for enabling intra-operative selection of an image registration transformation for use in displaying a first image dataset and a second image dataset in correspondence with one another includes image dataset acquisition devices which obtain the first and second image datasets, a processor coupled to the image dataset acquisition devices and which computes a similarity function indicative of a likelihood that the first and second image datasets are in correspondence with one another and then determines a ranking of each of a plurality of local maxima of the similarity function, a display device coupled to the processor and on which registration transformations derived from a plurality of the local maxima are displayed, and a user-interface coupled to the processor to enable selection of each registration transformation for subsequent use.

By presenting the physician with multiple possible registration transformations, the physician can readily view the different registration transformation results and sequentially select each to ascertain whether it is the clinically-optimal registration transformation. If the physician selects the highest ranked registration transformation but deems it non-optimal, the physician can quickly select another registration transformation and see whether this alternative is the clinically-optimal result. Determination of multiple registration transformations derived from a plurality of local maxima facilitates the ease and expediency by which the physician can conduct the operation or for which thevely The registration transformations can be displayed in rank order of the local maxima from highest to lowest, with the ranking being based on one or more of the following: extremal features such as a value of the similarity function at the local maxima, curvature of the local maxima and capture-range of the local maxima, data from prior transformations of two image datasets having similar characteristics as the first and second image datasets, and physician-input data from prior transformations of two image datasets having similar characteristics as the first and second image datasets and which is stored in the same database or repository of prior information as the data from prior transformations.

A method for enabling intra-operative selection of an image registration transformation for use in displaying a first image dataset and a second image dataset in correspondence with one another includes obtaining first and second image datasets, computing a similarity function indicative of a likelihood that the first and second image datasets are in correspondence with one another, determining a ranking of each of a plurality of local maxima of the similarity function, displaying a plurality of registration transformations derived from the local maxima, and enabling selection of each of the displayed registration transformations for subsequent use. Advantages of providing the physician with the easy ability to select one of plurality of different registration transformations are described above.

Ranking of the local maxima may be determined based on data from prior transformations of two image datasets having similar characteristics as the first and second image datasets. In this case, data characteristics from the first and second image datasets are derived and a database of previously obtained or prior transformation information is searched to identify cases or associated image datasets with similar data characteristics as the first and second datasets. Ranking of the local maxima can also be determined based on the physician-input data from prior transformations of two image datasets having similar characteristics as the first and second image datasets. In this case, physician-input data about prior cases is stored with the data characteristics of the prior cases. Ranking of the local maxima can also be determined using the external features of the local maxima of the similarity function. Preferably, all three of these techniques are used to determine the rank order of the registration transformations.

The invention, together with further objects and advantages thereof, may best be understood by reference to the following description taken in conjunction with the accompanying drawings wherein like reference numerals identify like elements.

Figure 1:
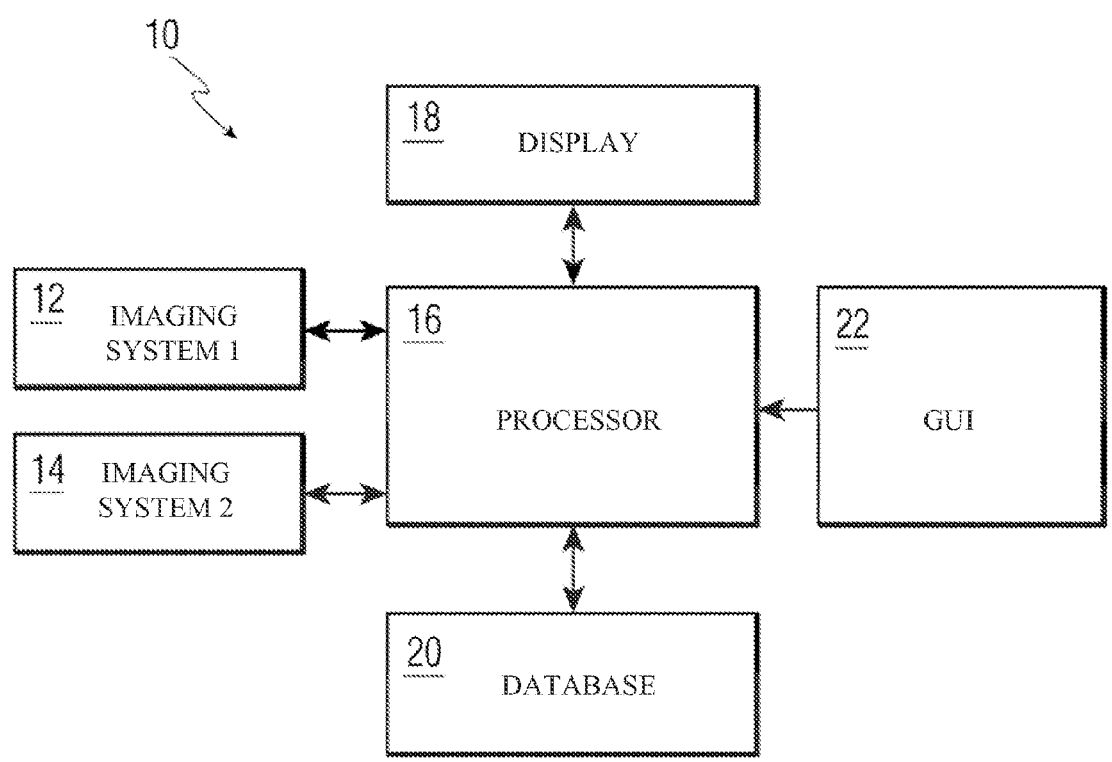
FIG. 1 is a schematic showing major parts of a system for performing a method in accordance with the invention.

Referring to the accompanying drawings wherein like reference numbers refer to the same or similar elements, FIG. 1 is a schematic showing major parts of a system 10 for performing methods in accordance with the invention. System 10 includes, in its most basic form, two imaging systems 12, 14 connected to a processor 16 which is also connected to a display 18, a memory component including a clinical database 20 and a graphical user interface (GUI) 22. Although shown separately, the GUI 22 can be integrated into the display 18, i.e., a touch-screen display.

Figure 2:
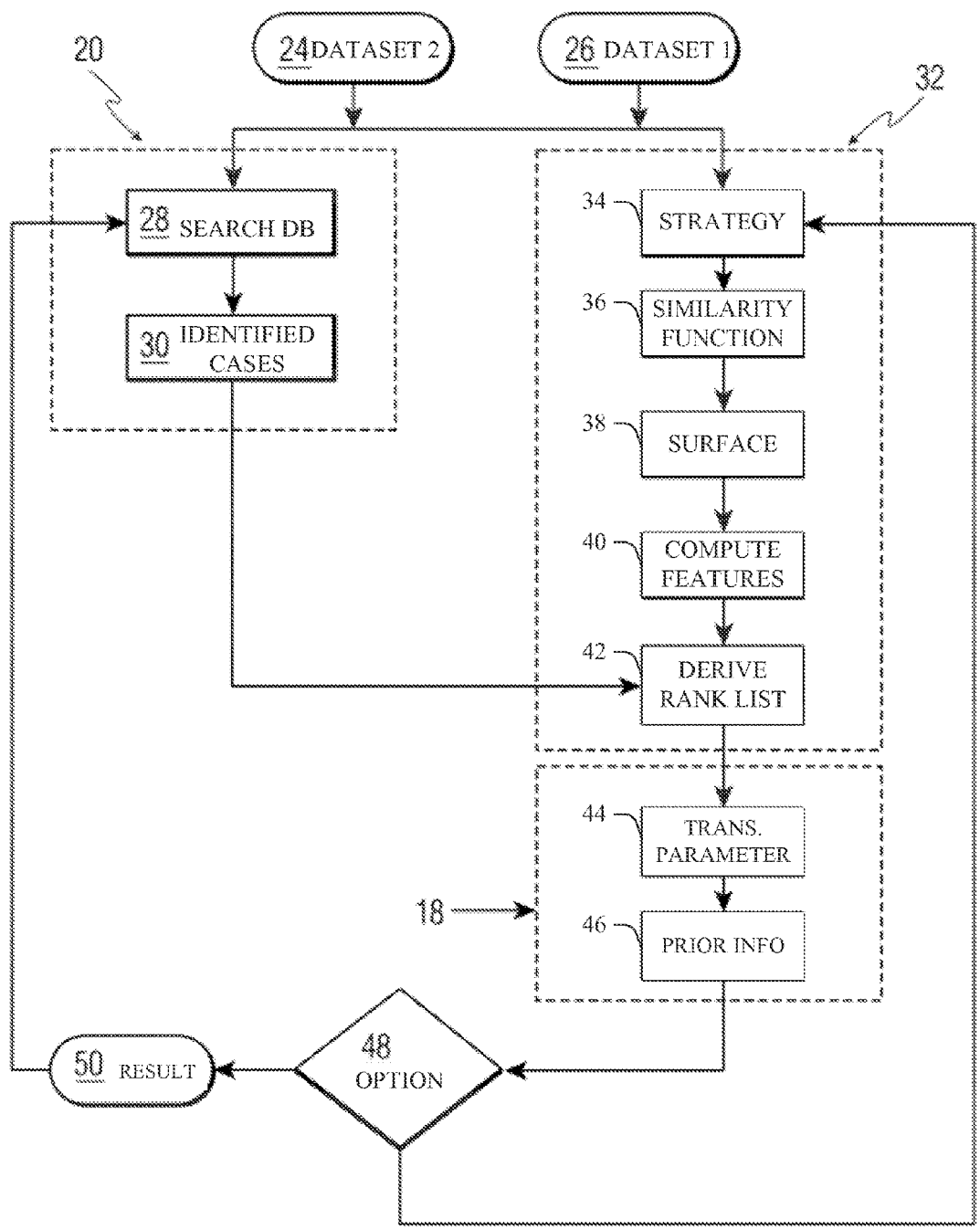
FIG. 2 is a flow chart of a method for encoding information in accordance with the invention.

FIG. 2 shows a flow chart of a method for forming and presenting a list of registration transformations to a physician to enable the physician to select one for intra-operative use. Although the description mentions presenting the list to a physician, it is understood that the invention is also applicable by other types of individuals requiring use of image transformations.

In the method, the first steps 24, 26 are to obtain multimodal datasets from the two imaging systems 12, 14. Typically, one of the datasets is obtained pre-operatively, e.g., from an imaging modality such as MDCT or MRI, and the other dataset is obtained intra-operatively, e.g., from a rotational X-ray system, an ultrasound system or electro-anatomical mapping. Nevertheless, depending on the manner in which the method is being used, the datasets can both be obtained pre-operatively or both intra-operatively. When obtained pre-operatively, the image dataset can be stored in a memory component which is accessed when the method is applied.

From the datasets, data characteristics are derived and directed to a repository of prior information in the database 20. Database 20 is searched 28 to identify cases, i.e., associated image datasets, with similar data characteristics as those in the datasets obtained via imaging systems 12, 14. The repository of prior information in the database 20 also includes physician-input from the identified cases 30, which is preferably used as additional information in registration transformation ranking, discussed more fully below. This physician-input is stored in the database 20 in association with the particular cases.

Substantially contemporaneously with the search of the clinical database 20, the registration procedure 32 is initiated. The registration procedure 32 involves selecting a geometric transformation model, similarity metric and optimization strategy 34. Several initial condition estimates for the transformation parameters are then derived from stochastic, uniform-gridded, adaptive probing or randomly-dispersed sampling of the similarity function 36.

Figure 3:
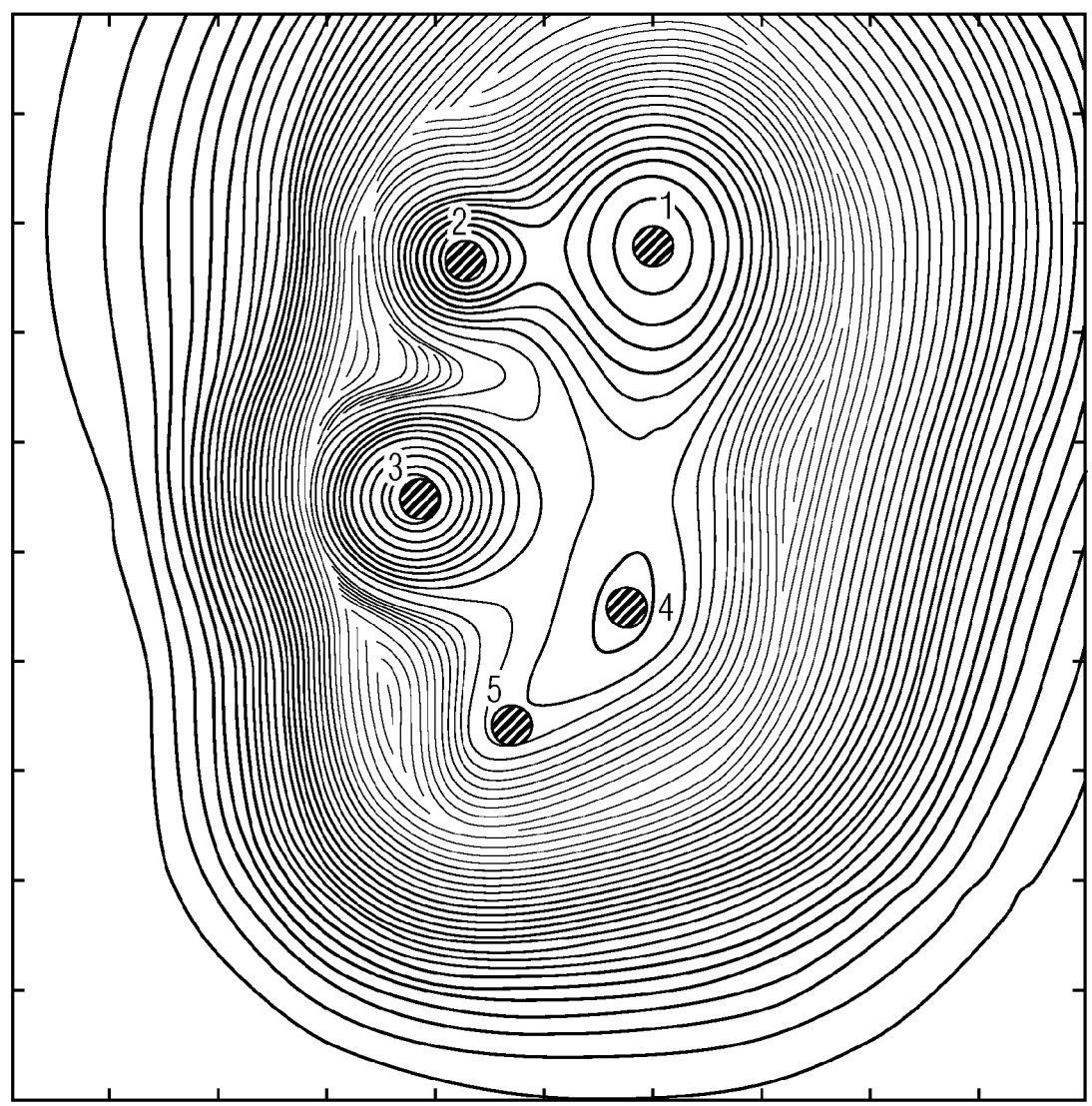
FIG. 3 shows a similarity function that could be formed in a method in accordance with the invention.

Local maxima are then identified from the probed cost surface 38. This can entail performing numerical optimization in parallel from each of the initial states and accumulating, during the iterations, a list of similarity cost surface values and gradients for each parameter search vector. After convergence for all starting conditions, the local maxima in the similarity function are identified based on the accumulated similarity cost surface features. FIG. 3 shows a graph of a similarity function with the top five local maxima identified.

Corresponding extremal features are then computed 40, including, for example, the similarity value, local curvature and capture range.

A registration transformation rank list is then derived 42 based, for example, on the extremal features and also preferably in consideration of information in database 20. For example, the registration transformations are rank-ordered according to one or more of the following factors: the value of the similarity function, the curvature of the maxima, and the capture-range of the maxima. This ordering is adaptively modified based on prior knowledge of physician-selections 30 derived from previous cases with similar features, i.e., analysis of the datasets relative to the physician-input contained in the database 20.

The registration transformation rank list is graphically depicted to the physician on the display 18, for example, as a list of large consecutive buttons or activation areas each with a three-dimensional fusion result from the corresponding transformation parameters 44. Specifically, for each rank position, in combination with the corresponding registration result, the values of the extremal features, e.g., the value of the similarity function, the curvature of the maxima, and the capture-range of the maxima, and summarized prior information from the repository of prior information 46 would be displayed.

Figure 4:
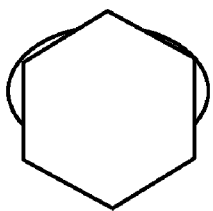
FIG. 4 is a table showing information derived from the similarity function shown in FIG. 3.
Figure 4:
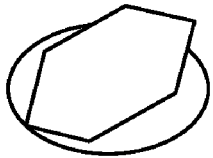
Figure 4:
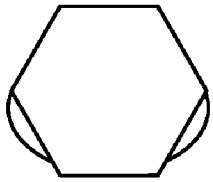
Figure 4:
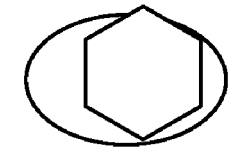
Figure 4:
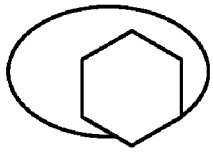

More specifically, FIG. 4 shows the ranking of the top five local maxima of the similarity function shown in FIG. 3 (in column 52) along with the value of the similarity function at the local maxima (in column 54). For illustration purposes only, a conceptual result showing the correspondence between the two image datasets is also shown (in column 56) with one image dataset being represented by an oval and the other being represented by a hexagon.

Figure 5:
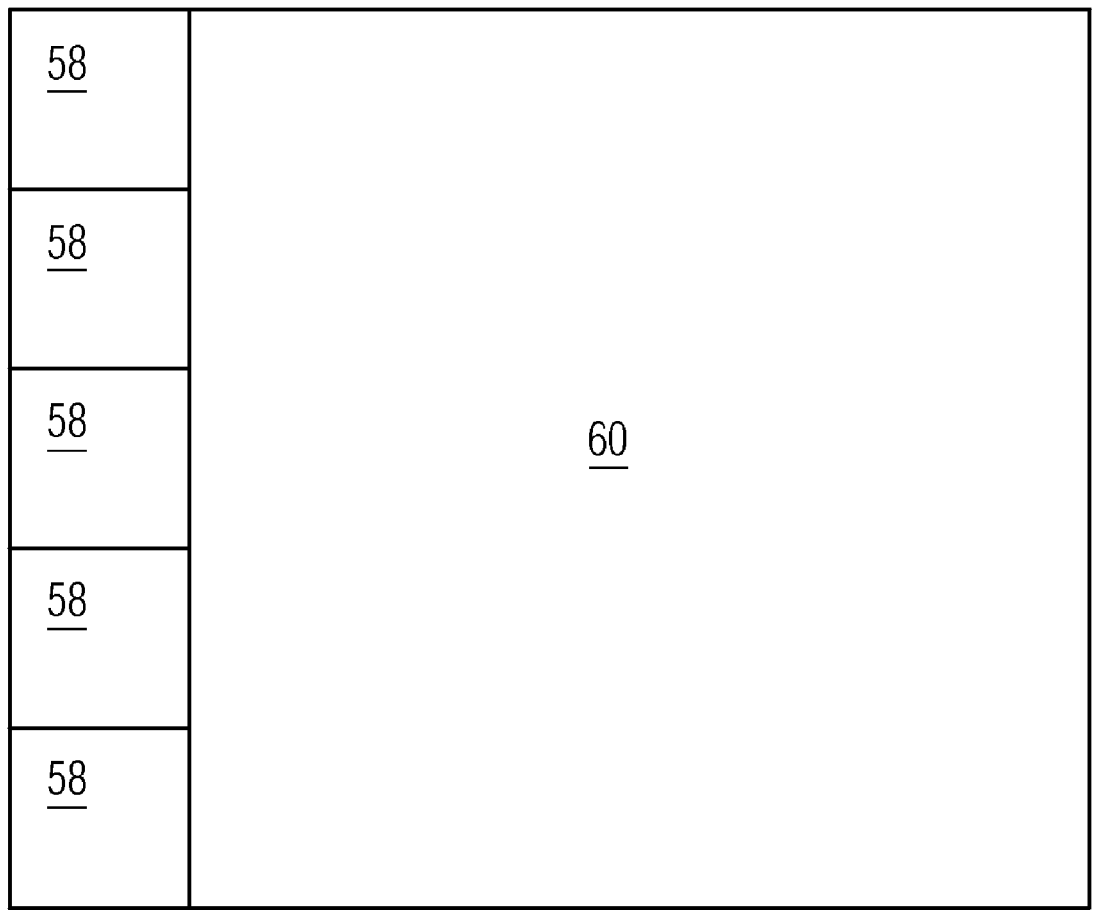
FIG. 5 shows the manner in which registration transformations are displayed in a system and method in accordance with the invention.

FIG. 5 is an exemplifying screen which would be displayed on display 18 applying a method in accordance with the invention based, for example, on the results shown in FIG. 3. FIG. 4 shows five activation areas 58 on the left with a large display area 60 to the right of activation areas 58. Display area 60 shows the selected registration transformation. The system 10 can be designed to automatically display the registration transformation with the largest local maxima in the uppermost one of the activation areas 58 and in the display area 60, with registration transformations with lesser local maxima being displayed in the other activation areas 58 in descending order of value. As shown, five activation areas 58 are present, each corresponding to, for example, to the top five local maxima identified from the similarity function shown in FIG. 3. However, a different number of activation areas 58 can be utilized.

Applying the method, the physician is provided with a plurality of registration transformation in activation areas 58, all of which can be easily and individually selected using the GUI 22 until the physician determines which provides a clinically-optimal fusion result. Thus, upon viewing the display 18, the physician can select an activation area 58 from the list which depicts what the physician believes will be the clinically-optimal result and this will be shown as an enlarged view in display area 60.

Referring back to FIG. 2, an option 48 is provided to allow a physician when not satisfied with the selected result, to begin the registration procedure 30 anew, starting with the selection of a geometric transformation model, similarity metric and optimization strategy 34. When the physician is satisfied with the selected result, the system 10 maintains the result 50 on the display 18 and the physician proceeds with the intervention using the GUI 22.

Physician selection of the clinically-optimal transformation and key features of each clinical datasets can be stored in the database 20 for future use as prior knowledge in registration playlist ranking for future studies. Physician selection of clinically-valid transformation parameters from a playlist of candidates can be used as a seed-point for a more localized and constrained search for additional candidate transforms. In essence, this refinement would provide for rapid hierarchical selection of the best clinical registration.

There are various applications of the method in accordance with the invention described above. One application is for use in multimodal dataset fusion for interventional guidance or diagnostics, e.g., for use in transforming images within a cardiac catheter laboratory, EP laboratory, or image-guided surgical suite. The method provides a simple and effective way to enable rapid, intraoperative selection of a clinically-optimal registration transformation that minimizes the need for manual-alignment since the physician can, using only a GUI, select from a visual depiction of a rank list of registration results corresponding to multiple local maxima identified in the similarity function.

The physician is able to quickly navigate the registration playlist, i.e., the activation areas 58, select a clinically-optimal transformation, and then proceed with the intervention. The method can also include multiple hierarchical steps for local refinement of the registration transformation.

Although illustrative embodiments of the present invention have been described herein with reference to the accompanying drawings, it is to be understood that the invention is not limited to these precise embodiments, and that various other changes and modifications may be effected therein by one of ordinary skill in the art without departing from the scope or spirit of the invention.

The invention claimed is:

1. A system for enabling intra-operative selection of an image registration transformation for use in displaying a first image dataset and a second image dataset in correspondence with one another, comprising:
    image dataset providing means for providing the first and second image datasets;
    a processor coupled to said image dataset providing means for computing a similarity function indicative of a likelihood that the first and second image datasets are in correspondence with one another and for determining a ranking of each of a plurality of local maxima of the similarity function;
    display means coupled to said processor for displaying a plurality of registration transformations derived from the local maxima based on the ranking; and
    a user-interface coupled to said processor to enable selection of each of said registration transformations for subsequent use.

2. The system of claim 1, wherein said image dataset providing means comprise a first image dataset acquisition device which acquires the first image dataset pre-operatively and stores it in a memory component and a second image dataset acquisition device which acquires the second image dataset intra-operatively.

3. The system of claim 1, wherein said image dataset providing means comprise a first image dataset acquisition device which acquires the first image dataset intra-operatively and a second image dataset acquisition device different than said first image dataset acquisition device and which acquires the second image dataset intra-operatively.

4. The system of claim 1, wherein said processor is arranged to direct said display means to display the registration transformations in rank order of the local maxima from highest to lowest.

5. The system of claim 1, wherein said processor is arranged to rank order the local maxima based in part on at least one of a value of the similarity function at the local maxima, curvature of the local maxima and capture-range of the local maxima.

6. The system of claim 1, wherein said processor is arranged to rank order the local maxima based in part on data from prior transformations of two image datasets having similar characteristics as the first and second image datasets.

7. The system of claim 6, wherein said processor is arranged to rank order the local maxima based in part on physician-input data from prior transformations of two image datasets having similar characteristics as the first and second image datasets.

8. The system of claim 1, wherein said image dataset providing means are arranged to acquire two different types of image datasets.

9. The system of claim 1, wherein said processor is arranged to direct said display means to display a selected one of the registration transformations in a larger format that non-selected ones of the registration transformations.

10. A method for enabling intra-operative selection of an image registration transformation for use in displaying a first image dataset and a second image dataset in correspondence with one another, comprising:
obtaining first and second image datasets;
computing a similarity function indicative of a likelihood that the first and second image datasets are in correspondence with one another;
determining a ranking of each of a plurality of local maxima of the similarity function;
displaying a plurality of registration transformations derived from the local maxima based on the ranking; and
enabling selection of each of the displayed registration transformations for subsequent use.

11. The method of claim 10, further comprising: deriving data characteristics from the first and second image datasets; and searching a database of transformation information to identify image datasets with similar data characteristics as the first and second image datasets, the ranking of the local maxima being determined based in part on data from the transformations of the identified image datasets having similar characteristics as the first and second image datasets.

12. The method of claim 11, further comprising storing physician-input data from the cases in conjunction therewith, the ranking of the local maxima being determined based in part on the physician-input data from prior transformations of two image datasets having similar characteristics as the first and second image datasets.

13. The method of claim 10, wherein the computation of the similarity function comprises: selecting a geometric transformation model, similarity metric and optimization strategy; and deriving initial condition estimates for transformation parameters from the similarity function, the method further comprising probing the similarity function to identify the local maxima.

14. The method of claim 10, further comprising computing extremal features of the local maxima of the similarity function, the ranking of the local maxima being determined using the extremal features.

15. The method of claim 10, further comprising determining a plurality of the top local maxima, only registration transformations derived from the top local maxima being displayed.

16. The method of claim 10, further comprising displaying in association with each registration transformation the values of extremal features of the local maxima of the similarity function and information about cases with datasets similar to the first and second image datasets obtained from a database of case information.

17. The method of claim 10, wherein the step of obtaining the first and second image datasets comprises obtaining the first image dataset pre-operatively; and obtaining the second image dataset intra-operatively.

18. The method of claim 10, wherein the step of obtaining the first and second image datasets comprises obtaining both the first and second image datasets intra-operatively.

* * * * *